United States Patent
Kall et al.

(10) Patent No.: US 7,672,327 B2
(45) Date of Patent: Mar. 2, 2010

(54) METHOD FOR PROVIDING MULTICAST AND/OR BROADCAST SERVICES TO USER TERMINALS

(75) Inventors: Jan Kall, Espoo (FI); Patrik Elykt, Helsinki (FI); Ahti Muhonen, Hirvihaara (FI)

(73) Assignee: Nokia Siemens Networks Oy, Espoo (FI)

( * ) Notice: Subject to any disclaimer, the term of this patent is extended or adjusted under 35 U.S.C. 154(b) by 965 days.

(21) Appl. No.: 10/493,767

(22) PCT Filed: Oct. 29, 2001

(86) PCT No.: PCT/EP01/12490

§ 371 (c)(1),
(2), (4) Date: Apr. 26, 2004

(87) PCT Pub. No.: WO03/039068

PCT Pub. Date: May 8, 2003

(65) Prior Publication Data

US 2004/0246985 A1 Dec. 9, 2004

(51) Int. Cl.
*H04J 3/26* (2006.01)
(52) U.S. Cl. .................. 370/432; 370/312; 370/449
(58) Field of Classification Search .......... 370/432, 370/312, 449
See application file for complete search history.

(56) References Cited

U.S. PATENT DOCUMENTS

| | | | | |
|---|---|---|---|---|
| 6,018,771 A | * | 1/2000 | Hayden | 709/231 |
| 6,122,483 A | * | 9/2000 | Lo et al. | 455/12.1 |
| 6,336,119 B1 | * | 1/2002 | Banavar et al. | 707/104.1 |
| 6,360,076 B1 | * | 3/2002 | Segura et al. | 455/67.11 |
| 6,374,112 B1 | * | 4/2002 | Widegren et al. | 455/452.2 |
| 6,418,141 B1 | * | 7/2002 | Votava | 370/390 |
| 6,781,999 B2 | * | 8/2004 | Eyuboglu et al. | 370/399 |
| 6,973,081 B1 | * | 12/2005 | Patel | 370/390 |
| 7,184,789 B2 | * | 2/2007 | Leung et al. | 455/519 |
| 7,272,651 B1 | * | 9/2007 | Bolding et al. | 709/227 |
| 2002/0023270 A1 | * | 2/2002 | Thomas et al. | 725/95 |
| 2002/0034166 A1 | * | 3/2002 | Barany et al. | 370/329 |

(Continued)

FOREIGN PATENT DOCUMENTS

WO    WO 00/57601    9/2000

OTHER PUBLICATIONS

W. Fenner, "Internet Group Management Protocol, version 2", RFC2236, Network Working Group, Nov. 1997, pp. 1-24.

(Continued)

*Primary Examiner*—Ricky Ngo
*Assistant Examiner*—Luat Phung
(74) *Attorney, Agent, or Firm*—Squire, Sanders & Dempsey, LLP

(57) ABSTRACT

The invention relates to a method for providing multicast and/or broadcast services to user terminals (8, 9) via a cellular network (2, 5). In order to increase the efficiency of multicast or broadcast transmissions, it is proposed that each of said user terminals (8, 9) willing to receive content data of at least one multicast and/or broadcast service enters at least once for a pre-determined time a state in which it is capable of receiving content data of said multicast and/or broadcast service. The invention equally relates to a corresponding user terminal, to a corresponding cellular network and to a corresponding mobile radio system.

19 Claims, 1 Drawing Sheet

U.S. PATENT DOCUMENTS

| | | | | |
|---|---|---|---|---|
| 2003/0043786 | A1* | 3/2003 | Kall et al. | 370/352 |
| 2003/0211859 | A1* | 11/2003 | Chen et al. | 455/518 |
| 2005/0053068 | A1* | 3/2005 | Toth et al. | 370/390 |
| 2007/0177592 | A1* | 8/2007 | Mooney et al. | 370/390 |

OTHER PUBLICATIONS

Chapter 6: "Mobility management functionality", ETSI Telecom Standards, GSM 03.60 Version, 6.3.2 Release 1997, EN 301 344 V 6.3.2, Jul. 1999, pp. 26-30, Xp002902573.

Xylomenos et al, "IP Multicast for Mobile Hosts", Jan. 1997, IEEE Communications Magazine, IEEE Service Center, vol. 35, No. 1, pp. 54-58, XP000683443.

W. Fenner, "Internet Group Management Protocol, version 2", RFC2236, Network Working Group, Nov. 1997, pp. 1- 24.

3GPP TS 22.146 V5.0.0 (Oct. 2001), Technical Specification, "$3^{rd}$ Generation Partnership Project; Technical Specification Group Services and System Aspects; Multimedia Broadcast/Multicast Service; Stage 1 (Release 5)", Oct. 2001, pp. 1- 12.

3GPP TS 23.060 V3.6.0 (Jan. 2001), Technical Specification, "$3^{rd}$ Generation Partnership Project; Technical Specification Group Services and System Aspects; General Packet Radio Service (GPRS); Service description; Stage 2 (Release 1999)", pp. 1-183.

\* cited by examiner

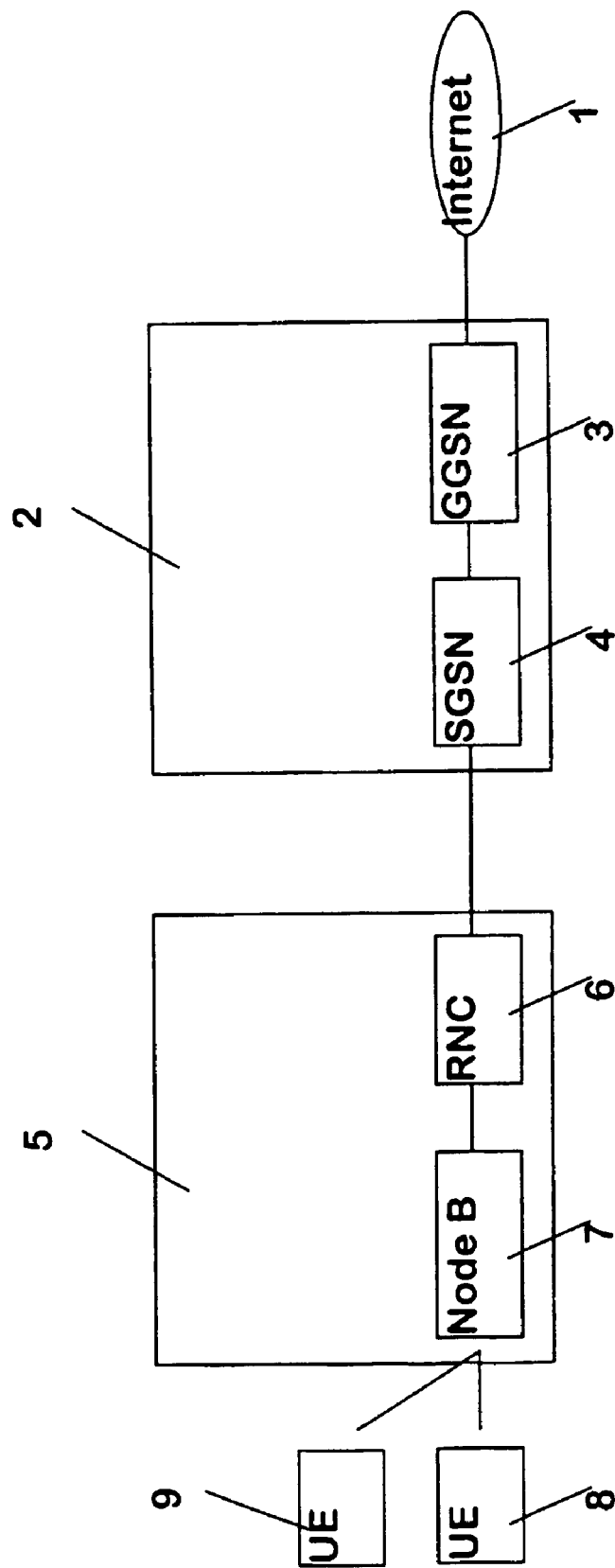

METHOD FOR PROVIDING MULTICAST AND/OR BROADCAST SERVICES TO USER TERMINALS

FIELD OF THE INVENTION

The invention relates to a method for providing multicast and/or broadcast services to user terminals via a cellular network. The invention equally relates to such a user terminal, to such a cellular network, to a network element of a cellular network, and to a mobile radio system comprising such a user terminal and such a cellular network.

BACKGROUND OF THE INVENTION

Broadcast and Multicast are methods for transmitting datagrams from a single source to several destinations, i.e. as point-to-multipoint transmission.

As mentioned in the technical specification 3GPP TS 22.146 V5.0.0 (2001-10): "Multimedia Broadcast/Multicast Service; Stage 1 (Release 5)", currently two such services are specified for cellular networks, the cell broadcast service (CBS) and the internet protocol (IP) multicast service.

The cell broadcast service enables a transmission of low bit-rate data to all subscribers in a set of given radio cells of a cellular network over a shared broadcast channel.

The transmission of content data for IP multicast services, provided e.g. by an internet service provider, to user terminals via a radio interface can currently be supported by GPRS (general packet radio system) based cellular networks. It is required, however, that a point-to-point PDP (packet data protocol) context is set up between every user terminal and a network element of the GPRS network, i.e. the GGSN (Gateway GPRS support node), and every user terminal receiving a IP multicast transmission occupies a separate radio channel. Several radio channels thus deliver the same content in a point-to-point way through a GPRS system.

For UMTS, 3GPP (3rd generation partnership project) is developing new services for multicast and broadcast in UMTS. In the above mentioned technical specification 22.146, 3GPP provides for example a stage one description of broadcast and multicast services for UMTS. One desirable feature for new multicast services is for example to enable the transmission of an IP-multicast service content via a radio access network of a UMTS system to several user terminals with a shared radio channel. For both, new broadcast and new multicast services, a procedure for activating a broadcast or multicast session on the radio interface still has to be provided.

From an IP multicast content source point of view, the handling of a multicast transmission by a radio access network should be similar to IP-multicast, in order to avoid a conflict with the IETF IP-Multicasting standards.

In the RFC (Request for Comments) 2236: "Internet Group Management Protocol, Version 2", of November 1997, it is specified for example that multicast routers use IGMP (Internet Group Management Protocol) to learn which groups have members on each of their attached physical networks. It is requested that a multicast router keeps a list of multicast group memberships for each attached network, and a timer for each membership. The expression 'Multicast group memberships' means the presence of at least one member of a multicast group on a given attached network, not a list of all of the members.

SUMMARY OF THE INVENTION

It is an object of the invention to enable an efficient delivery of multicast and/or broadcast services to mobile users by a cellular network. It is in particular an object of the invention to enable an activation of multicast or broadcast sessions only in such radio cells of the cellular network, in which the number of likely receivers exceeds a predetermined value.

In order to reach the objects of the invention, a method for providing multicast and/or broadcast services to user terminals via a cellular network is proposed, in which method each of these user terminals which is willing to receive content data of at least one multicast and/or broadcast service enters at least once for a predetermined time a state in which it is capable of receiving content data of said multicast and/or broadcast service.

The state in which a user terminal willing to receive content data of a specific multicast or broadcast service is in addition capable of receiving such content data will also be referred to as READY state. In the state in which a user terminal is willing to receive content data of a specific multicast or broadcast service, it is in contrast not capable without any further action of receiving such content data will be referred to as STANDBY state.

The object is equally reached with a user terminal, with a cellular network, with a network element for a cellular network, and with a communication system comprising means for realizing the proposed method.

The invention proceeds from the idea that if a user terminal enters for a time a READY state when it is willing to receive content data of a multicast and/or broadcast service, it can be provided with such content without any further action being required for the transmission during this time, thus making the delivery of a service more efficient.

In a preferred embodiment of a first approach for further developing the invention, at least some of the user terminals willing to receive content data of at least one multicast and/or broadcast service transmit a corresponding indication to the cellular network, which indication can provide the network in particular with an information on which multicast and/or broadcast services the respective user terminal is willing to receive. The indication can consist for example of an indication that a respective user terminal joins a group of user terminals willing to receive at least one specific multicast and/or broadcast service. As consequence, the cellular network can determine whether there is a sufficient number of likely receivers in a specific cell for the delivery of multicast and/or broadcast services.

Advantageously, the cellular network has moreover knowledge about the time during which a user terminal remains in a READY state. In this case, the cellular network does not only know how many likely receivers there are for a service, but also many of them are currently in a READY state and for how long. The cellular network does not have an information on the exact location of user terminals in the STANDBY state. With the knowledge about the time during which each user terminal remains in a READY state, the cellular network can therefore determine with an increased certitude the number of likely receivers in a specific cell for the delivery of multicast and/or broadcast services.

The time during which a respective user equipment remains in a READY state can be fixed for all user terminals and known at the network. In this case, the network knows already only with the indication of a user terminal that it is willing to receive content data for a multicast and/or broadcast service, for how long this user terminal will stay in the READY state and thus be able to receive content data.

Alternatively, at least some of the user terminals willing to receive content data of at least one multicast and/or broadcast service transmit in addition an indication to the cellular network for how long they will remain in the READY state. The indication of a time for how long a user terminal will be in the READY state could also be transmitted by itself to the cellular network. This is of particular interest for a later point of time, at which a user terminal has already switched from the READY state to the STANDBY state, and then returns to the READY state, e.g. because of some other transmission.

The first approach of the invention enables a network element of the cellular network in particular to immediately respond to a polling by a multicast and/or broadcast router wishing to provide content data for a service, since it knows for how long how many user terminals willing to receive such content data will be in the READY state.

In a preferred embodiment of a second approach for further developing the invention, a network element of the cellular network transmits a paging message when a multicast/broadcast router starts to deliver content data for a specific multicast or broadcast service. To this paging message, each user terminal, which is willing to receive content data of this specific multicast or broadcast service but for which said predetermined time has passed, can respond, in case it actually receives the paging message.

This second approach is based on the idea that if user terminals in a STANDBY state are paged by the cellular network when a multicast or broadcast service is to be provided, the number of responses by these terminals indicates to the cellular network whether there is a sufficient number of likely receivers for the delivery of multicast and/or broadcast services.

It is an advantage of the second approach of the invention that an evaluation of likely receivers is also possible, after the terminals in this cell have turned to the STANDBY state. The evaluation can be performed separately for each radio cell of the cellular network.

Also in the second approach, each user terminal willing to receive content data of at least one multicast and/or broadcast service can transmit a corresponding indication to the cellular network. This indication can provide the cellular network with additional information for paging.

Both approaches thus provide the cellular network with a reliable information on a minimum number of user terminals which are currently available for receiving content data of a broadcast or multicast service.

It is a further advantage of both approaches of the invention, that from the content source point of view, the handling can be made similar to the IETF specified IP multicasting.

The invention can be employed in particular, though not exclusively, for UMTS.

Further, the invention can be employed in particular for supporting IP multicasting via the radio interface of a cellular network, but also for other types of multicast services or for broadcast services.

Preferred embodiments of the invention are included in the subclaims.

BRIEF DESCRIPTION OF THE FIGURES

In the following, the invention is explained in more detail with reference to a drawing, of which the only FIGURE shows an environment in which an embodiment the invention can be employed.

DETAILED DESCRIPTION OF THE INVENTION

The only FIGURE shows selected elements of a communication system that are involved in embodiments of the invention according to the first or the second approach, which both support IP-multicasting via a cellular network to user terminals. The system comprises the internet, a PLMN as cellular network providing UMTS, and user terminals.

In the FIGURE, the internet 1 is connected to a GGSN 3 of a core network 2 of the PLMN. The GGSN 3 is further connected via an SGSN (switching GPRS support node) 4 of said core network 2 to at least one RNC 6 of an UTRAN 5 of the PLMN. Within the UTRAN 5, the RNC 6 has a controlling access to at least one node B 7. The node B 7, finally, can provide via a radio interface a connection to user terminals 8, 9 which are located in a radio cell defining the coverage area of the node B 7.

A user terminal 8, 9 that is subscribing a specific multicast service provided by an internet service provider and that is currently willing to receive this service informs the cellular network that it joins a multicast group defined for receiving this specific service. The mobile joins this group using a specific multicast PDP context or a normal PDP context which is transmitted to the cellular network.

After joining the group, the user terminal 8, 9 remains in a READY state for a predetermined time, i.e. until a timer T1 provided in the user terminal 8, 9 runs up. Then, the user terminal 8, 9 enters a STANDBY state. The READY state will be entered again for the predetermined time when a PDP context is activated for a data transmission. Only in the READY state, a user terminal 8, 9 is able to receive multicast or broadcast transmissions without first having to activate a PDP context.

A differentiation between a STANDBY state and a READY state has already been described for GPRS, e.g in the technical specification 3GPP TS 23.060 V3.6.0 (2001-01): "General Packet Radio Service (GPRS); Service description; Stage 2 (Release 1999)". In the STANDBY state, paging messages for data or signaling information transfers may be received. It is necessary, however, to activate a PDP context before data can be transmitted or received. Such an activation can be initiated by the user terminal e.g. upon a paging message. For user terminals in the READY state, the network transmits no GPRS paging messages, since the user terminal is already able in this state to send and receive PDP PDUs (protocol data units) employed for transmitting content data. The READY state is supervised by a timer. A user terminal moves from the READY state to the STANDBY state when the timer expires.

The timer T1 of the user terminals 8, 9 depicted in the FIGURE may be identical with the timer currently defined for GPRS. Alternatively, it may be a new timer introduced specifically for multicast services.

Within the cellular network, the information that a user terminal 8, 9 has joined a multicast group is received by the node B 7 and forwarded via the RNC 6 and the SGSN 4 to the GGSN 3. The GGSN 3 thus knows which user terminals 8, 9 have joined a multicast group for a specific service.

In the embodiment according to the first approach, a user terminal 8 joining a multicast group transmits at the same time a timer value MC1, which indicates for how long this user terminal 8 will be able to receive an IP multicast transmission for this multicast group, i.e. for how long it will remain in the READY state.

Equally, another user terminal 9 may join the same multicast group and transmit a corresponding timer value MC2.

The timer values MC1, MC2 are forwarded together with the indication that a user terminal 8, 9 wishes to join a specific multicast group to the GGSN 3. The RNC 6 and the SGSN 4 also know the user terminals 8, 9 that are still able to receive multicast messages after having joined a corresponding multicast group.

In case an IP-multicast router wants to transmit content data for a specific IP multicast service received from an internet service provider, it first performs a polling with the GGSN 3. Only if the GGSN 3 responds to the polling, the content data will actually be transmitted. Since the GGSN 3 knows the timer values MC1, MC2 of all user terminals 8, 9 that have joined a specific multicast group, it is at any time aware of whether there are user terminals 8, 9 in its coverage area, which are still in the READY state. As long as there are such user terminals in the READY state, it can respond to a polling by a multicast router.

In the embodiment according to the second approach, a determination of user terminals 8, 9 which have joined a specific multicast group and are still available for receiving content for this service is carried out by the RNC 6.

When an IP multicast router starts to deliver content data for a specific multicast service, the GGSN 3 forwards the content data via the SGSN 4 to the RNC 6. The RNC 6 shall activate a multicast session in those cells for which it controls the radio resources, in which there are user terminals 8, 9 that have joined the corresponding multicast group.

User terminals 8, 9 that are in the READY state simply receive a start message from the RNC 6 informing them about the start of a multicast session.

The RNC 6 is not aware, however, whether a user terminals 8, 9 in the STANDBY state, which have joined the respective multicast group, is still located in a radio cell supplied by the RNC 6. Therefore, the user terminals 8, 9 in the STANDBY state are first paged by the RNC 6, in order to enable the RNC 6 to determine in which radio cell they currently are.

In the presented embodiment, the employed paging is a special paging for multicast services. It contains specific multicast indicators, more specifically a multicast group indication, a multicast channel indication, and possibly some other information. The number of bits that can be used on the GPRS paging channel is limited. For this reason, all indicators are defined in a shortened form. Because the paging normally serves more than one user terminal, however, the paging message can be e.g. 2 to 3 times larger than the normal paging to a single user terminal.

All user terminals 8, 9 that are in the coverage area of the RNC 6 and that have joined the multicast group indicated in the paging message can respond to the paging after a random delay. This random delay ensures that collisions between a large number of simultaneous responses are avoided. The multicast channel indication in the paging message indicates to the user terminal 8, 9 which radio channel is to be employed for the transmission of content data for the service via the radio interface.

In the RNC 6, a number is defined which corresponds to a sufficient number of responses to a paging message. This number may for instance be 3, but it may also be lower or higher. As soon as the RNC 6 has received a number of responses which is equal to the predetermined number, the RNC 6 transmits a "paging finished" message on the paging channel. As a result, the user terminals 8, 9 which are still waiting to send their paging response due to the respective random delay, will refrain from sending a response. This function is of particular importance in large scale applications, in which there may be hundreds of user terminals 8, 9 which have joined a specific multicast group in a single radio cell.

When the RNC 6 receives only one or two multicast paging responses from a radio cell, or in general terms less responses than the predetermined number, it forwards these back to the core network 2. In the core network 2, a multicast service center, the GGSN 3 or the SGSN 4 can then decide, whether point-to-point connections using the normal PDP context mechanism should be set up to the corresponding user terminals 8, 9. The decision may be based on operator capacity preferences or on user preferences given e.g. by different tariff levels.

This second approach can also be combined with the first approach. A paging could for instance be carried out only in cases in which there are not sufficient number of user terminals in the READY state. Alternatively, the paging could be employed as a control function also when there are still enough timers active which indicate that user terminals are in a READY state.

It is to be noted that even though both approaches were described for IP multicasting, they are equally applicable for other types of multicast and broadcast services.

The invention claimed is:

1. A method, comprising:
   transmitting a paging message to user terminals when a multicast/broadcast router starts to deliver content data for a specific multicast or broadcast service, the user terminals configured to enter a state at least once for a predetermined time in which the terminals are configured to receive content data of at least one of a multicast or a broadcast service; and
   receiving a response from at least some user terminals,
   wherein the response comprises a time indicating how long the user terminals will remain in said state in which they are configured to receive the content data of said at least one of the multicast or the broadcast service in a cellular network.

2. The method according to claim 1, further comprising:
   receiving an indication from at least some user terminals, the indication indicating that a user terminal comprises a willingness to receive the content data of at least one of a multicast service and a broadcast service.

3. The method according to claim 2, wherein the receiving the indication comprises receiving the indication using a dedicated packet data protocol context for indicating that a user terminal comprises a willingness to receive the content data of the at least one of the multicast or the broadcast service.

4. The method according to claim 2, wherein the receiving the indication comprises receiving the indication that a user terminal comprises a willingness to receive the content data of the at least one of the multicast or the broadcast service by a network element of said cellular network, the method, further comprising:
   when said network element receives a polling from the multicast/broadcast router which intends to transmit the content data for the specific multicast or the specific broadcast service, responding to said polling when there are user terminals that have indicated that they comprise a willingness to receive the content data of said specific multicast or broadcast service,
wherein said predetermined time in which the user terminals are configured to receive the content data of said at least one of the multicast or the broadcast service has not passed.

5. The method according to claim 1, wherein the receiving the indication comprises receiving the response using a dedicated packet data protocol context for indicating said time that a user terminal is configured to remain in said state in which it is configured to receive the content data of said at least one of the multicast or the broadcast service.

6. The method according to claim 1, wherein the receiving the response comprises receiving said response indicating a time for how long a user terminal is configured to remain in said state in which it is configured to receive said at least one of the multicast or the broadcast service at a network element of said cellular network,
the method, further comprising:
when the network element receives a polling from the multicast/broadcast router which intends to transmit the content data for the specific multicast or the specific broadcast service, responding to polling when there are user terminals of which said indicated time has not passed.

7. The method according to claim 1, wherein the receiving the response from a user terminal comprises receiving the response to the paging message upon expiration of the predetermined time.

8. The method according to claim 1, further comprising:
receiving the response from at least some user terminal, wherein the response is configured to show a willingness to receive the content data of the at least one of the multicast or the broadcast service by the cellular network.

9. The method according to claim 1, further comprising:
transmitting a start message from a network element to the user terminals, when the multicast/broadcast router starts to deliver the content data for the specific multicast or broadcast service to said network element of said cellular network,
wherein the start message is configured to indicate that a multicast or broadcast session is starting, and wherein the user terminals are configured to receive the content data of the at least one of the multicast or the broadcast service.

10. The method according to claim 1, wherein the transmitting the paging message comprises transmitting a dedicated paging message configured for said at least one of the multicast or the broadcast service.

11. The method according to claim 1, wherein the transmitting the paging message comprises transmitting the paging message comprising at least one of a multicast or broadcast group indication configured to indicate said specific multicast or broadcast service for which the content data is to be transmitted, and a multicast or broadcast channel indication configured to indicate a radio channel configured to transmit said content data via a radio interface to said user terminals.

12. The method according to claim 1, wherein the receiving the response comprises receiving a response to the paging message from a user terminal, which indicated that it comprises a willingness to receive the content data of said specific multicast or broadcast service and which receives the paging message, but for which said predetermined time has passed, after a random delay.

13. The method according to claim 1, further comprising:
transmitting an indication that a paging is terminated after a network element of the cellular network has received at least a predetermined number of responses to said paging message,
wherein the user terminals, which have not yet responded to said paging message, are configured not to respond after receiving said indication that said paging is terminated.

14. The method according to claim 1, further comprising:
transmitting the content data for the specific multicast or broadcast service delivered by the multicast/broadcast router in a specific radio cell without a further decision of a transmission in the cellular network, when a network element of the cellular network receives at least a predetermined number of responses from the user terminals located in the specific radio cell; and
determining in the cellular network whether a point-to-point connection is to be established to the user terminals in the specific radio cell which responded to the paging message, when the network element of the cellular network receives less than the predetermined number of responses from the user terminals located in the specific radio cell for the paging message.

15. An apparatus, comprising:
transmission means for transmitting a paging message to user terminals when a multicast/broadcast router starts to deliver content data for a specific multicast or broadcast service, the user terminals being configured to enter a state at least once for a predetermined time in which they are configured to receive content data of at least one of a multicast or a broadcast service and to respond to the paging message; and
receiving means for receiving at least one response from at least some of the user terminals configured to receive the content data of the at least one of the multicast or the broadcast service,
wherein the at least one response comprises a time indicating how long the user terminals is configured to remain in said state in which they are configured to receive the content data of said at least one of the multicast or the broadcast service in a cellular network.

16. An apparatus, comprising:
a network element, comprising a transmitter configured to transmit a paging message to user terminals when a multicast/broadcast router starts to deliver content data for a specific multicast or broadcast service, the user terminals being configured to enter a state at least once for a predetermined time in which they are configured to receive content data of at least one of a multicast or a broadcast service and to respond to the paging message; and
a receiver configured to receive at least one response from at least some of the user terminals configured to receive the content data of the at least one of the multicast or the broadcast service,
wherein the at least one response comprises a time indicating how long the user terminals is configured to remain in said state in which they are configured to receive the content data of said at least one of the multicast or the broadcast service in a cellular network.

17. A system, comprising:
an apparatus, comprising a network element, comprising
a transmitter configured to transmit a paging message to user terminals when a multicast/broadcast router starts to deliver content data for a specific multicast or broadcast service, the user terminals being configured to enter a state at least once for a predetermined time in which the terminals are configured to receive content data of at least one of a multicast or a broadcast service and to respond to the paging message; and a receiver configured to receive at least one response from at least some of the user terminals configured to receive the content data of the at least one of the multicast or the broadcast service, wherein the at least one response comprises a time indicating how long the user terminals is configured to remain in said state in which they are configured to receive the content data of said at least one of the multicast or the broadcast service in a cellular network.

18. An apparatus, comprising:

a transmitter configured to transmit a paging message to user terminals when a multicast/broadcast router starts to deliver content data for a specific multicast or broadcast service, the user terminals being configured to enter a state at least once for a predetermined time in which they are configured to receive content data of at least one of a multicast or a broadcast service and to respond to the paging message; and a receiver configured to receive at least one response from at least some of the user terminals configured to receive the content data of the at least one of the multicast or the broadcast service, wherein the at least one indication comprises a time indicating how long the user terminals is configured to remain in said state in which they are configured to receive the content data of said at least one of the multicast or the broadcast service in a cellular network.

19. The apparatus according to claim 18, wherein said apparatus comprises a radio network controller of a universal mobile telecommunication services cellular network.

* * * * *

UNITED STATES PATENT AND TRADEMARK OFFICE
CERTIFICATE OF CORRECTION

PATENT NO. : 7,672,327 B2  Page 1 of 1
APPLICATION NO. : 10/493767
DATED : March 2, 2010
INVENTOR(S) : Jan Kall et al.

It is certified that error appears in the above-identified patent and that said Letters Patent is hereby corrected as shown below:

On the Front Page of the Patent, Section (75) the Second Inventor's Last Name should read:

FLYKT

Signed and Sealed this

Eleventh Day of May, 2010

David J. Kappos
*Director of the United States Patent and Trademark Office*